United States Patent [19]

Grayson

[11] 4,172,518

[45] Oct. 30, 1979

[54] STACKING CONTROL FOR A RADIAL STACKER

[76] Inventor: Leonard Grayson, 105 Shady La., Morristown, N.J. 07960

[21] Appl. No.: 722,280

[22] Filed: Sep. 10, 1976

[51] Int. Cl.$^2$ .............................................. B65G 41/02
[52] U.S. Cl. .................................... 198/631; 198/301; 198/508; 198/865
[58] Field of Search ............... 198/301, 351, 352, 353, 198/354, 355, 508, 631, 859, 865; 235/61.11 R, 61.11 B; 318/162, 567, 574; 318/443, 444

[56] References Cited

U.S. PATENT DOCUMENTS

| 2,852,727 | 9/1958 | Barnett | 318/162 |
| 3,061,075 | 10/1962 | Wise | 198/631 |
| 3,101,435 | 8/1963 | Welch et al. | 318/162 |
| 3,205,859 | 9/1965 | Fine et al. | 198/631 |
| 3,443,513 | 5/1969 | Jureit et al. | 198/350 |
| 3,444,987 | 5/1969 | Palmer | 198/301 |
| 3,474,315 | 10/1969 | Tomita et al. | 318/162 |
| 3,519,908 | 7/1970 | Plumley | 318/162 |
| 3,618,744 | 11/1971 | Hulette | 198/508 |
| 3,621,978 | 11/1971 | Smith | 198/301 |
| 3,946,506 | 3/1976 | Snow, Jr. et al. | 198/301 |

FOREIGN PATENT DOCUMENTS

| 2253693 | 7/1975 | France | 198/508 |
| 1184903 | 3/1970 | United Kingdom | 198/508 |

Primary Examiner—James B. Marbert
Assistant Examiner—Jeffrey V. Nase
Attorney, Agent, or Firm—Lerner, David, Littenberg & Samuel

[57] ABSTRACT

Apparatus is provided for controlling the operation of a radial stacker which is adapted to dispense aggregate material in the form of a stack. The radial stacker includes a conveyor for dispensing the aggregate material which moves horizontally through a plurality of dispensing positions to form a level of the stack, and which moves vertically through a plurality of levels to form the stack. One end of the conveyor is supported at a fixed pivot so that it is capable of traversing a horizontal arc of up to 340°. Preposition switches are provided so that the operator may manually set the vertical and horizontal starting point of a cycle. A horizontal drive moves the conveyor horizontally to each position in a level and is controlled by a first timer. A second timer controls the amount of time that the conveyor spends at each of the positions in a level dispensing material. A vertical drive moves the conveyor in a vertical direction to each level to be formed in the stack and is controlled by a third timer. Horizontal and vertical stepping-drum programmers are provided for controlling the sequence and operation of the first, second, and third timers. The radial stacker of the present invention is capable of operating in either a continuous or intermittent mode as it moves through the positions of each level. To operate the radial stacker in the continuous mode, it is only necessary to set the first and second timers at their zero settings.

10 Claims, 4 Drawing Figures

STACKING CONTROL FOR A RADIAL STACKER

FIELD OF THE INVENTION

The present invention relates generally to apparatus for controlling the operation of a radial stacker which dispenses aggregate material in the form of a stack, and specifically to improved control apparatus for totally automating the operation of radial stackers through the use of a plurality of presettable timers and stepping-drum programmers.

BACKGROUND OF THE INVENTION

Until the present time, radial stackers employed in the mining and aggregate industry generally, required manual operation for all or part of their movements. However, in order to reduce the need for skilled manpower, it has long been desired to develop a control apparatus for such radial stackers which is totally automated and trouble free so that manpower problems could be reduced.

The prior art control apparatus for such radial stackers typically included a plurality of limit switches or probes. However, it has been found through experience that such limit switches freeze or become inoperable in cold or wet weather. As a result, radial stackers employing such limit switches or probes have a high amount of downtime and require a great deal of maintenance and repair work. In addition, such systems require constant surveillance by one or more operators, and this has become a problem as a result of shortages of skilled manpower.

Broadly, it is an object of the present invention to provide improved control apparatus for controlling the operation of a radial stacker which overcomes one or more of the aforesaid problems. Specifically, it is within the contemplation of the present invention to provide improved control apparatus for completely and automatically controlling the load-out cycle of a radial stacker and which does not require manpower to monitor the operation of same. At the completion of the loadout cycle, the operation of the radial stacker is automatically stopped, and an alarm is initiated to indicate the completion of the cycle.

It is a further object of the present invention to provide an improved control apparatus for controlling the operation of radial stackers which includes a plurality of presettable timers for controlling the horizontal and vertical movements of the radial stacker, in combination with suitable programmers for controlling the sequence of the timers.

SUMMARY OF THE INVENTION

Briefly, in accordance with the principles of this invention, apparatus is provided for controlling the operation of a radial stacker which dispenses aggregate material in the form of a stack. The radial stacker includes means for dispensing the aggregate material, typically in the form of an endless conveyer, which is adapted to move in a horizontal direction through a plurality of dispensing positions to form each level of the stack, and which is also adapted to move in a vertical direction through a plurality of levels to form the stack. The dispensing means or endless conveyer is typically supported by a tower, and the end remote from the dispensing end of the endless conveyer is mounted to move about a fixed pivot point so that it is capable of traversing a horizontal arc of up to 340°.

The apparatus includes horizontal and vertical preposition switches so that the operator can preset the starting point of the endless conveyer both horizontally and vertically. In addition, the control apparatus includes a reset counter so that the operator may preset the number of positions out of the 340° arc that the endless conveyer will move through to form a level of the stack. For example, the reset counter may be preset to any number of positions between zero and 14. Therefore, if the reset counter is set at zero and 14, the endless conveyer will traverse horizontally through all 15 positions (or 340°) to form the level. At subsequent levels, the reset counter can be preset with a different number of positions, such as 3 and 10. In this manner, at the next level, the endless conveyer will traverse horizontally from position 3 to position 10, before it is raised to the next level. This would continue until all the desired levels of the stack are formed.

Suitable drive means are provided for moving the endless conveyer horizontally to each position in a level. In addition, a first timer is provided for controlling the time that the horizontal drive means is operated for moving the endless conveyer between each of the dispensing positions in a level and thereby controls the space between each position. There is also provided a second timer for controlling the amount of time that the endless conveyer spends at each of the dispensing positions in a level dispensing material. Of course, it should be understood that if the first and second timers are set at zero, the endless conveyer will traverse each level in a continuous mode dispensing material continuously, and without stopping at each position to dispense material as in the intermittent mode of operation.

Suitable drive means are also provided for moving the endless conveyer in a vertical direction to the next level to be formed in a stack after the endless conveyer completes its horizontal traverse and has formed the previous level. A third timer is provided for controlling the time that the vertical drive means operates for moving the endless conveyer to the next level of the stack and thereby controls the space between each level.

Finally, horizontal and vertical stepping-drum programmers are provided for controlling the sequence of operation of the first, second, and third timers. Specifically, the horizontal stepping-drum programmer operates to actuate the first and second timers alternately with each other until the endless conveyer moves through each position of the level. In the preferred embodiment, the second timer is actuated first by the horizontal programmer so that it times out at the first position of the level while the endless conveyer dispenses its material at the first position. Then, the horizontal programmer operates to actuate the first timer to control the time of horizontal movement of the endless conveyer to the second position. When the first timer times out so that the endless conveyer is at the second position, the second timer is again actuated by the horizontal programmer so that it controls the time that the endless conveyer dispenses the material at the second potition. The actuation of the first and second timers in this alternate manner by the horizontal programmer continues until the endless conveyer completes its horizontal traverse through all of the positions which have been preset by the reset counter and which are required to form the level. Then, the horizontal programmer operates to actuate a vertical stepping switch, which automatically energizes the vertical stepping-drum programmer. Once energized, the vertical programmer operates to actuate the third timer, which controls the time that the vertical drive means is energized for moving the endless conveyer to the next level to be formed in the stack. When the third timer times out and the vertical movement of the endless conveyer is completed, the horizontal stepping-drum programmer is again energized to repeat its sequence of operation at the next level and to repeat its alternate actuation of the first and second timers. However, the horizontal traverse of the endless conveyer at this next level will be in an opposite direction to that of the previous level so that, for example, the endless conveyer would traverse sequentially from position 14 to position zero.

After all the levels are formed and the stack is completed, the radial stacker stops operation and actuates an alarm and flasher to indicate that the load-out cycle has been completed.

As can be seen from the foregoing brief description of the operation of the present invention, the improved control apparatus completely and automatically controls the entire load-out cycle of the radial stacker to form each level and complete the stack. It is only necessary for an operator at the beginning of the load-out cycle to preposition the endless conveyer and to preset the reset counter and the first, second, and third timers. Accordingly, as the radial stacker automatically moves through its load-out cycle, the operator is free to perform other essential duties, and monitoring of the operation of the radial stacker by the operator is not required.

BRIEF DESCRIPTION OF THE DRAWINGS

Further objects, features, and advantages of the present invention will become apparent upon the consideration of the following detail description of a presently-preferred embodiment when taken in conjunction with the accompanying drawings, wherein.

DETAILED DESCRIPTION OF PREFERRED EMBODIMENT OF THE INVENTION

Figure 1:
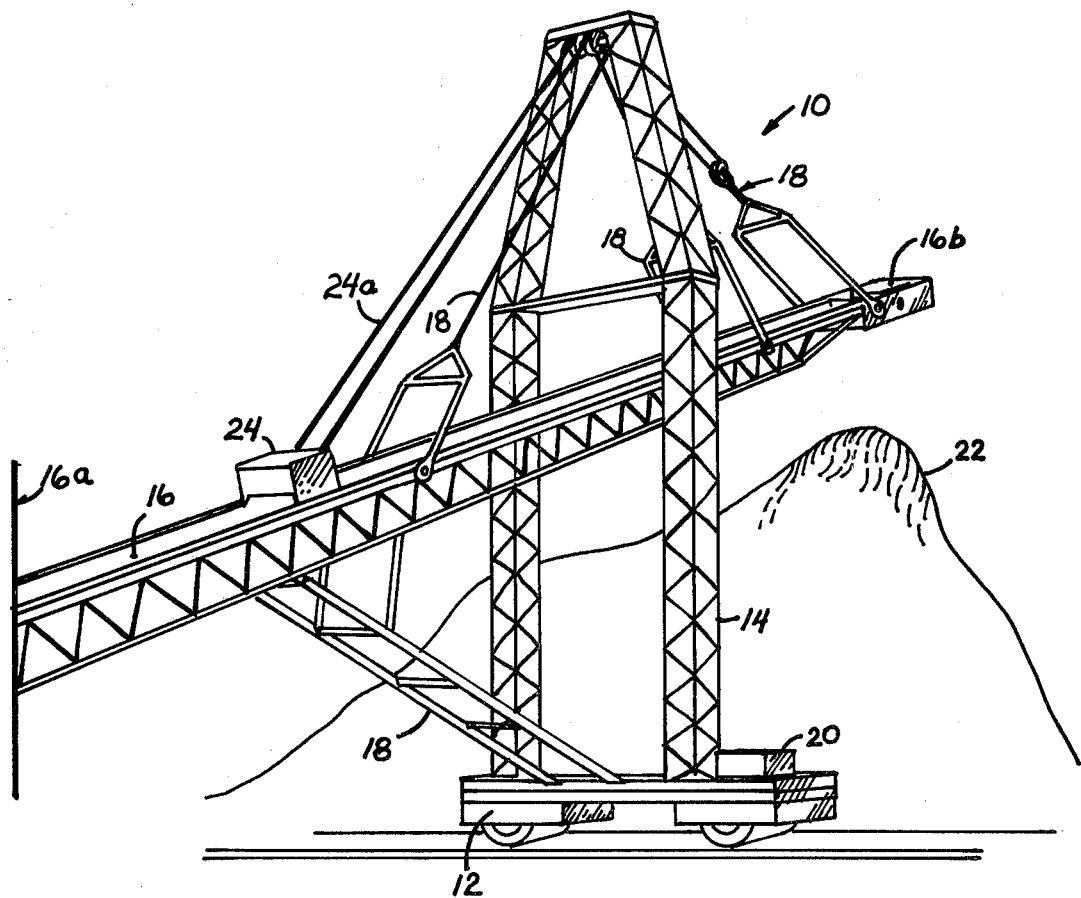
FIG. 1 is a perspective view of a radial stacker adapted to employ the improved control apparatus of the present invention.

Referring now to FIG. 1, there is shown a radial stacker adapted to employ the improved control apparatus of the present invention, generally designated by the reference numeral 10, and which is essentially conventional in structure. Radial stacker 10 includes a movable carriage or trolley 12 for transporting a supporting tower 14 which supports means for dispensing the aggregate material. The dispensing means may take any form, and in the preferred embodiment is in the form of an endless conveyer 16, which is connected to supporting tower 14 by a plurality of suitable connecting members 18. One end 16a of endless conveyer 16 is connected to a fixed pivot point so that endless conveyer 16 may move in a horizontal arc about the fixed pivot point. The other end 16b of endless conveyer 16 dispenses the aggregate material to form the stack 22. It should be noted at this point that the radial stacker of the present invention may be employed to dispense aggregate material of any type including those at power plants, mining locations, limestone plants, etc.

Horizontal drive means are provided for horizontally moving trolley 12 and endless conveyer 16 and may take the form of a motor and drive 20 mounted on trolley 12. Horizontal drive 20 includes two starting coils (not shown) for forward and reverse movement of trolley 12 and conveyer 16. As will be explained, horizontal drive 20 operates to move endless conveyer 16 horizontally through a plurality of dispensing positions to form each level of the stack 22. In addition, vertical drive means are provided for vertically moving the endless conveyer 16 in a vertical direction to the next level to be formed in the stack 22. The vertical drive means may take the form of a motor and drive 24 mounted on conveyer 16 for moving endless conveyer 16 in a vertical direction. The vertical drive 24 may include a chain or cable arrangement 24a connected to tower 14 for moving endless conveyer 16 in a vertical direction about pivot point 16a. Vertical drive 24 includes two starting coils (not shown) for up or down movement of conveyer 16. As will be explained below, the vertical drive 24 operates to move endless conveyer 16 vertically from one level to the next to form stack 22.

Figure 2A:
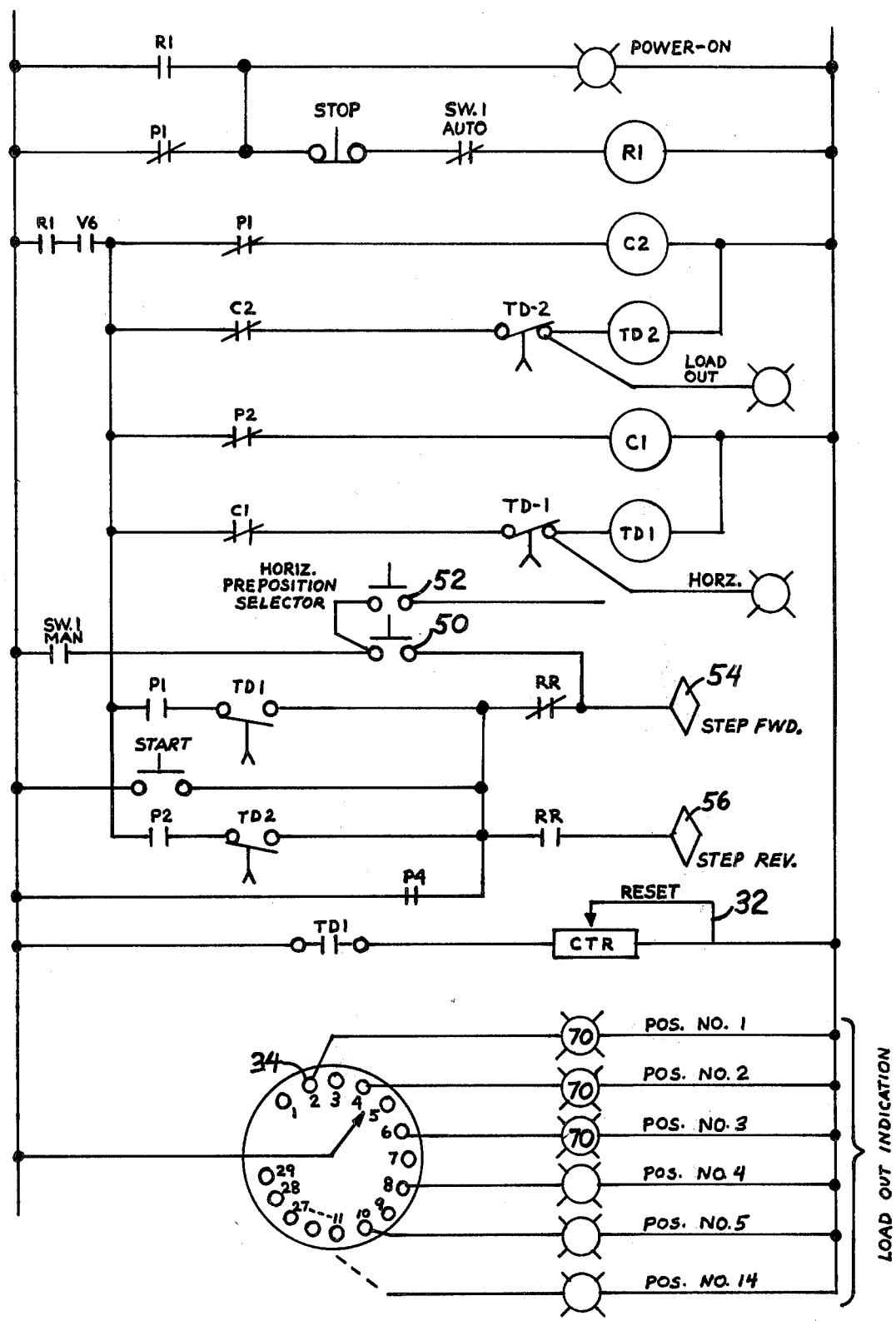
FIGS. 2A and 2B are a schematic illustration of the control circuit of the present invention.
Figure 2B:
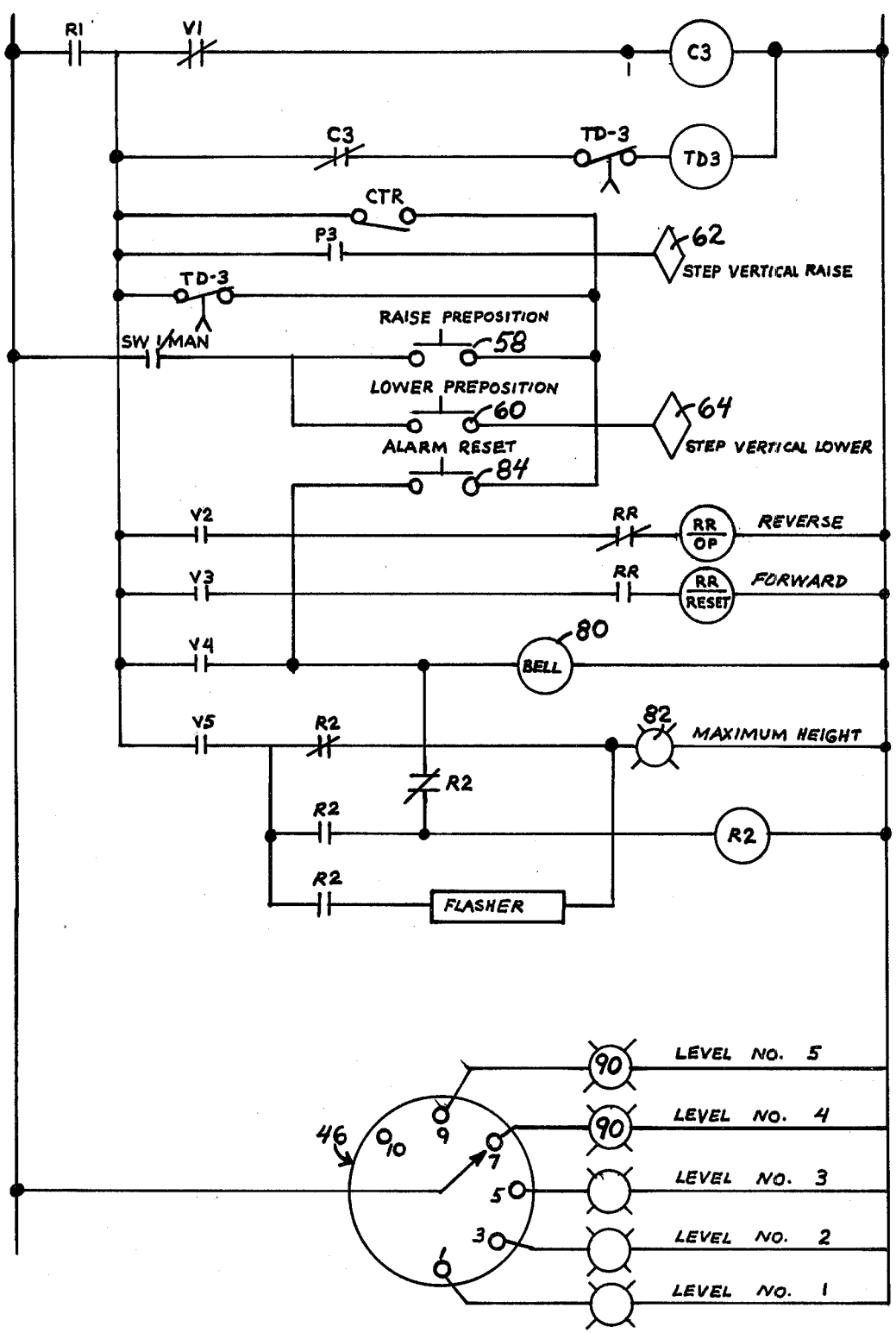

Now turning to FIG. 2, there is shown a preferred embodiment of the improved control apparatus of the present invention. One component of the control apparatus includes a reset counter 32 for presetting the number of positions in a level and the size of the arc (up to 340°) which endless conveyer 16 will move through. In this particular embodiment, reset counter includes 15 positions designated consecutively from zero through 14. In this manner, for each horizontal traverse or level that endless conveyer 16 will move through, the operator may preset reset counter 32 to the number of positions desired in each level of the stack. For example, the reset counter 32 can be set for the first level at zero and 14 so that conveyer 16 will move through all 15 positions and a 340° arc. However, at the next level, reset counter 32 may be reset by the operator at 3 and 10 so that conveyer 16 at the next level will only move through positions 3 through 10. Therefore, reset counter 32 can be preset so that conveyer 16 moves through the same number of positions at each level, or reset counter 32 can be preset at each level so that conveyer 16 can move through a decreasing number of positions at each level. Alternately, additional reset counters may be added for each level so that each of the reset counters can be set at the beginning of a cycle to automatically decrease the horizontal traverse of conveyer 16 at each level.

An essential component of the control apparatus is timer TD1 which controls the time that horizontal drive means 20 operates for moving conveyer 16 to each of the preset number of positions in a level. In this manner, timer TD1 controls the distance of horizontal traverse of conveyer 16 between each of the preset number of dispensing positions set on reset counter 32. An additional essential component of the control apparatus is timer TD2 for controlling the amount of time that conveyer 16 spends at each of the preset dispensing positions to dispense the aggregate material. Therefore, once timers TD1 and TD2 have been set, conveyer 16 will horizontally traverse through each level and intermittently stop at each position to dispense material. This is referred to as the intermittent mode of operation. Of course, it should be understood that the control apparatus of the present invention may also operate in a continuous mode if timers TD1 and TD2 are set at zero. In the continuous mode, conveyer 16 moves continuously through each horizontal level and continuously dispenses material uniformly throughout the level, without stopping at each position.

Another essential component of the control apparatus is timer TD3 for controlling the time that vertical drive 24 operates to move conveyer 16 from a previously-formed level to the next level of the stack 22 to be formed. Therefore, by changing the setting of timer TD3, the vertical distance between each level may be increased or decreased.

Figure 3:
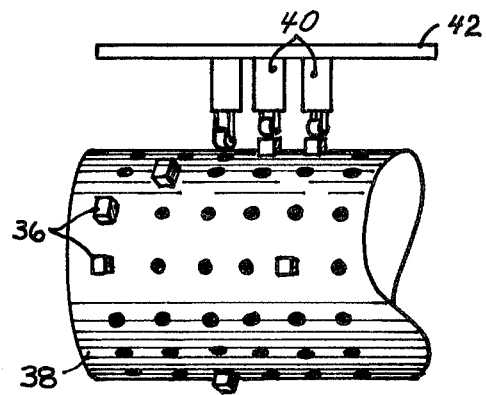
FIG. 3 is a detail perspective view of a stepping-drum programmer employed in the control apparatus of the present invention.

Control means are provided for controlling the sequence of operation of the first, second, and third timers TD1, TD2, and TD3. Such control means are preferably in the form of stepping-drum programmers. For example, the stepping-drum programmer, Model 2410, made by the Tenor Company of New Berlin, Wisconsin, would be a suitable type of programmer which may be employed for controlling the timers. Such a stepping-drum programmer is an electro-mechanical device which provides stored program logic for controlling sequential operations. As shown in FIG. 3, the logic program is stored in a drum 38, which is step driven by an electric motor through a Geneva mechanism (not shown), which apparatus is of conventional construction and need not be described in detail. The program is established by placing plugs 36 into the drum 38. The plugs 36 actuate switches 40 mounted on a bar 42 adjacent to the drum. Each time the drum 38 steps from one position to the next, only those switches opposite the program plugs 36 are actuated. At each step of the drum, the actuated switches energize the desired timers, relays, etc. Before drum 38 will index from one step to the next, all of the required operations in the current step must be completed, except where the program calls for maintained action through several steps. Typically, drum 38 may have 30 positions in each row around the diameter of the drum, and 16 positions in each column of the drum. Accordingly, as the drum rotates, it steps between 30 positions.

In the present invention, a stepping-drum programmer of the above-described type is employed as a horizontal stepping-drum programmer 34, as shown in FIG. 2. Programmer 34 is employed to alternately actuate timers TD1 and TD2 at each dispensing position of a level. In particular, load switch P1 operates to actuate timer TD1, and load switch P2 operates to actuate timer TD2. In addition, horizontal programmer 34 also operates to actuate load switches P3 and P4. Load switch P3 is a vertical stepping switch, which, when actuated, operates to energize a second vertical stepping-drum programmer 46, as will be explained below. Load switch P4 is an automatic horizontal stepping switch, which, when actuated, operates to step the horizontal programmer 34 back to step one at the end of a cycle of operation of the horizontal programmer 34. As a result, horizontal programmer 34 controls timers TD1 and TD2 for each of the dispensing positions which have been preset on reset counter 32. In the drawings, it is noted that P1 without a slash through the contacts designates a normally-open set of contacts, whereas P1 with a slash through the contacts designates a normally-closed set of contacts. This also applies to the other sets of contacts including P2, C1, C2, R1, R2, and V1, etc. Also, in the drawings, the switches designated TD1, TD2, and TD3 indicate that these switches are controlled by the timers with corresponding designations. Further, it is noted that the contactors, such as R1, R2, C1, C2, and C3, shown in the drawings surrounded by circles, indicate that these contactors control the sets of contacts with corresponding designations. The following table illustrates the sequence of operations for the horizontal stepping-drum programmer 34 for 10 dispensing positions.

TABLE I

| System Operation | Control Device to Advance to Next Step | Step | Timer TD2 (Load-out) | Timer TD1 (Horiz. Mov.) | Vertical Step Switch | Automatic Step (Horiz.) |
|---|---|---|---|---|---|---|
| | | | 1 | 2 | 3 | 4...16 |
| | | | Load Switches "p" | | | |
| Vertical Enable | V6 | 1 | X | X | X | |
| Loadout @ Position #1 | TD2 Times Out | 2 | | X | | |
| Horizontal Movement | TD1 Times Out | 3 | X | | | |
| Loadout @ Position #2 | TD2 Times Out | 4 | | X | | |
| Horizontal Movement | TD1 Times Out | 5 | X | | | |
| Loadout @ Position #3 | TD2 Times Out | 6 | | X | | |
| Horizontal Movement | TD1 Times Out | 7 | X | | | |
| Loadout @ Position #4 | TD2 Times Out | 8 | | X | | |
| Horizontal Movement | TD1 Times Out | 9 | X | | | |
| Loadout @ Position #5 | TD2 Times Out | 10 | | X | | |
| Horizontal Movement | TD1 Times Out | 11 | X | | | |
| Loadout @ Position #6 | TD2 Times Out | 12 | | X | | |
| Horizontal Movement | TD1 Times Out | 13 | X | | | |
| Loadout @ Position #7 | TD2 Times Out | 14 | | X | | |
| Horizontal Movement | TD1 Times Out | 15 | X | | | |
| Loadout @ Position #8 | TD2 Times Out | 16 | | X | | |
| Horizontal Movement | TD1 Times Out | 17 | X | | | |
| Loadout @ Position #9 | TD2 Times Out | 18 | | X | | |
| Horizontal Movement | TD1 Times Out | 19 | X | | | |
| Loadout @ Position #10 | TD2 Times Out | 20 | | X | | |
| | | 21 | X | X | | X |
| . | | | | | | |
| . | | | | | | |
| Vertical Enable | V6 | 30 | X | X | X | |

In the present invention, a vertical stepping-drum programmer 46, of the type described above, is also employed and operates to actuate timer TD3 each time conveyer 16 completes a level so that conveyer 16 is raised to the next level of the stack to be formed. In particular, vertical stepping-drum programmer 46 operates to actuate load switches V1 through V6. Load switch V1 actuates timer TD3 to raise conveyer 16. Load switches V2 and V3 operate to actuate reverse relay RR/OP and reverse relay RR/RESET, respectively. In this manner, at the end of each vertical movement of conveyer 16, the horizontal drive 20 is caused to operate in a forward or reverse direction. More particularly, the actuation of reverse relay RR/OP energizes the reverse starting coil 56 of horizontal drive 20, and the actuation of reverse relay RR/RESET operates to energize forward starting coil 54 of horizontal drive 20. In this manner, each time the conveyer 16 is raised to the next level, it will alternately be moved in a forward or reverse direction at each level, in a manner to be explained. Load switches V4 and V5 operate to actuate an alarm bell and flasher, and load switch V6 of vertical programmer 46 is a horizontal stepping switch which operates to re-energize the horizontal programmer 34 after timer TD3 times out. The following table illustrates the sequence of operations for the vertical stepping-drum programmer 46 for the forming of a stack having five levels.

lower conveyer 16. In this manner, the operator may actuate either selector switches 58 or 60 to move conveyer 16 to the desired vertical starting point.

Once the conveyer 16 is prepositioned horizontally and vertically, the operator may now determine the load-out stacking requirements and preset the controls before the cycle begins to automatically and completely control the entire load-out cycle. The versatility of the control apparatus 30 of the present invention allows the operator to control the radial stacker in an intermittent mode or in a continuous mode. In the intermittent mode, the operator presets reset counter 32 to the number of positions desired to form a level. In addition, the operator presets timers TD1, TD2, and TD3 to control, respectively, the distance of horizontal traverse of conveyer 16 between each position of a level, the time that conveyer 16 spends at each position in the level to load out the material, and the time that vertical drive 24 is energized to raise conveyer 16 to the desired height for the next level of the stack to be formed. In the continuous mode, timers TD1 and TD2 would be set at zero so that conveyer 16 would move continuously through each position of the level continuously dispensing material in a uniform matter throughout its movement, without stopping at any position. Once the timers and reset

TABLE II

| System Operation | Control Device to Advance to Next Step | Loads Step | Timer TD3 (Vert. Mov.) 1 | Reverse Relay RR/OP 2 | Reverse Relay RR/RESET 3 | Alarm Bell 4 | Flasher & Max. Height Lt. 5 | Horizontal Step Switch 6 | 7...16 |
|---|---|---|---|---|---|---|---|---|---|
| | | | | | Load Switches "V" | | | | |
| Loadout @ Level #1 | P3 Closes | 1 | X | | X | | | X | |
| Vertical Movement | TD3 Times Out | 2 | | X | | | | | |
| Loadout @ Level #2 | P3 Closes | 3 | X | X | | | | X | |
| Vertical Movement | TD3 Times Out | 4 | | | X | | | | |
| Loadout @ Level #3 | P3 Closes | 5 | X | | X | | | X | |
| Vertical Movement | TD3 Times Out | 6 | | X | | | | | |
| Loadout @ Level #4 | P3 Closes | 7 | X | X | | | | X | |
| Vertical Movement | TD3 Times Out | 8 | | | X | | | | |
| Loadout @ Level #5 | P3 Closes | 9 | X | | X | | X | X | |
| Max. Height Alarm | Reset Pushbutton | 10 | | | | X | X | | |
| Max. Height Flasher | Reset Pushbutton | 11 | | | | | X | | |
| Stop | | 12 | | | | | | | |
| | | . | | | | | | | |
| | | . | | | | | | | |
| | | 30 | | | | | | | |

The operation of the control apparatus 30 for controlling the radial stacker 10 will now be explained. Before the cycle begins, the operator may preposition conveyer 16 at a desired horizontal and vertical position which will determine the starting point of the cycle. To accomplish this, the operator actuates horizontal preposition selector switches 50 or 52. Operation of selector switch 50 energizes starting coil 54 to energize horizontal drive 20 in a forward direction. Alternately, operation of selector switch 52 energizes starting coil 56 to energize horizontal drive 20 in a reverse direction. Therefore, by actuating either forward switch 50 or reverse switch 52, the operator may move conveyer 16 horizontally to the desired horizontal starting point. Similarly, to preposition conveyer 16 at a desired vertical point, the operator actuates either selector switch 58 or selector switch 60. Actuation of selector switch 58 energizes starting coil 62, which energizes vertical drive 24 to raise conveyer 16. Actuation of selector switch 60 energizes starting coil 64 to energize vertical drive 24 to counter have been preset, the operator presses start switch 66, and the operating cycle begins and continues automatically until the cycle is finished and the stack 22 is completed.

Assuming that the intermittent mode has been selected, conveyer 16 begins loading out at position No. 1, level No. 1. Based on the times which have been preset for timers TD1 and TD2, conveyer 16 will begin horizontal movement in a forward direction from position No. 1 through position No. 14, stopping at each of the positions to dispense material and then moving to the next position until the level is completed. As shown in Table I above, during this sequence, timers TD1 and TD2 are alternately actuated by switches P1 and P2 of horizontal programmer 34 to control the operation of endless conveyer 16. The position of conveyer 16 at any time during the operation can be determined at a glance, as each position is indicated by lights 70 on the control panel. Reset counter 32 determines when conveyer 16 has traversed to position No. 14 and has completed the load out for that level.

As shown in Table I above, when all the load-out positions of a level have been completed, switch P3 closes and automatically operates to energize vertical programmer 46. As shown in Table II above, switch V1 of programmer 46 operates to energize timer TD3, which energizes starting coil 62 of vertical drive 24 to raise conveyer 16 to the next level to be formed. After timer TD3 times out, reverse relay RR/OP is operated by switch V2 to energize reverse starting coil 56 of horizontal drive 20 so that at this next level, conveyer 16 moves in the reverse direction from position 14 to position 1 to form level No. 2. At position No. 14, level No. 2, switch V6 operates to re-energize horizontal programmer 34 to repeat its sequence and move conveyer 16 from position No. 14 to position No. 1 to form level No. 2. Vertical programmer 46 is again energized and operates to raise conveyer 16 to position No. 1, level No. 3. After timer TD3 times out and conveyer 16 is raised to level No. 3, load switch V3 is actuated by vertical programmer 46 to energize reverse relay RR/RESET shown in Table II and FIG. 2 of the drawings. Relay RR/RESET operates to energize starting coil 54 so that horizontal drive 20 will cause conveyer 16 to move in the forward direction during its traversal of level No. 3. The position of conveyer 16 at any time during the cycle can be determined at a glance, as each level is indicated by lights 90 on the control panel. As shown in Tables I and II above, the sequence of operations continues until five levels are formed, and the desired stack is completed. Then, load switches V4 and V5 of vertical programmer 46 operate to energize an alarm bell 80 and a flashing light 82 to indicate that the stack has been completed and that the preset cycle of load out has finished. The operator then resets the alarm 80 by actuating switch 84, but the flashing light 82 remains on until the radial stacker is repositioned.

In view of the foregoing, it will be understood that the improved control apparatus 30 of the present invention provides a completely and totally automatic system for controlling the load-out cycle of a radial stacker. As a result, the manpower requirements are reduced and allows the operator to go about other duties while the radial stacker goes through the load-out cycle. In addition, the present system eliminates the need for limit switches or probes and thereby reduces maintenance and repair problems for radial stackers.

A latitude of modification, change, and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for controlling the operation of a radial stacker which includes means for dispensing aggregate material in a stack, said dispensing means being controlled to move horizontally through a plurality of dispensing positions to form a level, and being controlled to move vertically through a plurality of levels to form a stack, comprising:
   means for supporting said dispensing means;
   means for horizontally driving said dispensing means to each position in a level;
   first means for controlling said horizontal driving means for moving said dispensing means to each of said positions without the use of limit switches, said first means including a first timer;
   second means including a second timer for controlling the amount of time said dispensing means dispenses material at each of said positions;
   means for vertically driving said dispensing means in a vertical direction to each level to be formed in said stack;
   third means for controlling said vertical driving means for moving said dispensing means to each of said levels of said stack without the use of limit switches, said third means including a third timer; and
   a horizontal programmer and a vertical programmer for controlling the sequence of operation of said first, second, and third timers.

2. Apparatus in accordance with claim 1 wherein said first timer includes means for intermittently or continuously controlling said horizontal driving means.

3. Apparatus in accordance with claim 1 further including an alarm system for indicating the completion of a cycle and the forming of a stack.

4. Apparatus in accordance with claim 1 further including means for presetting the number of positions in a level which said dispensing means moves through.

5. Apparatus in accordance with claim 4 wherein said presetting means includes a resettable counter.

6. Apparatus in accordance with claim 1 further including a horizontal preposition switch and a vertical preposition switch for prepositioning said dispensing means before the commencement of a cycle of operation.

7. Apparatus in accordance with claim 1 wherein said dispensing means includes an endless conveyer pivotally mounted at one end thereof.

8. Apparatus in accordance with claim 1 further including means for driving said horizontal drive means in a forward or reverse direction.

9. Apparatus in accordance with claim 1 further including means for driving said vertical drive means in a first or second direction.

10. Apparatus in accordance with claim 1 wherein said horizontal programmer controls said first and second timer, and said vertical programmer controls said third timer.